United States Patent
Park et al.

(10) Patent No.: US 10,649,692 B2
(45) Date of Patent: May 12, 2020

(54) STORAGE DEVICE, SYSTEM INCLUDING THE SAME AND METHOD OF OPERATING THE SAME

(71) Applicant: SAMSUNG ELECTRONICS CO., LTD., Suwon-si, Gyeonggi-Do (KR)

(72) Inventors: Hyun-Chul Park, Suwon-si (KR); Jun-Ho Ahn, Suwon-si (KR); Bong-Gwan Seol, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 363 days.

(21) Appl. No.: 15/390,865

(22) Filed: Dec. 27, 2016

(65) Prior Publication Data

US 2018/0032283 A1  Feb. 1, 2018

(30) Foreign Application Priority Data

Jul. 29, 2016  (KR) ......................... 10-2016-0096759

(51) Int. Cl.
*G06F 11/14* (2006.01)
*G06F 3/06* (2006.01)

(52) U.S. Cl.
CPC ............ *G06F 3/0659* (2013.01); *G06F 3/061* (2013.01); *G06F 3/065* (2013.01); *G06F 3/0619* (2013.01); *G06F 3/0656* (2013.01); *G06F 3/0688* (2013.01); *G06F 11/1456* (2013.01)

(58) Field of Classification Search
None
See application file for complete search history.

(56) References Cited

U.S. PATENT DOCUMENTS

| 7,275,140 | B2 | 9/2007 | Paley |
| 8,019,944 | B1* | 9/2011 | Favor ................. G06F 12/0831 |
| | | | 711/118 |
| 8,819,336 | B2 | 8/2014 | Kwon et al. |
| 8,838,875 | B2 | 9/2014 | Park |
| 8,886,870 | B2 | 11/2014 | Adler et al. |
| 9,123,725 | B2 | 9/2015 | Cho et al. |
| 9,159,441 | B2 | 10/2015 | Kim et al. |
| 9,323,667 | B2 | 4/2016 | Bennett |

(Continued)

FOREIGN PATENT DOCUMENTS

KR  20150018690 A  2/2015

*Primary Examiner* — Brian R Peugh
(74) *Attorney, Agent, or Firm* — Volentine, Whitt & Francos, PLLC

(57) ABSTRACT

A method of operating a storage device includes receiving a write task from a host device. The method also includes storing the write task in a task queue included in the storage device. A write execution command is received from the host device. The method includes executing the write task in response to the write execution command and performing an internal management operation of the storage device after the write task is stored in the task queue and before the write execution command is received. The response time of the storage device to the write execution command is reduced and performance of the system is enhanced by performing the internal management operation such as the data backup operation during the queuing stage and the ready stage in advance before receiving the write execution command.

20 Claims, 19 Drawing Sheets

(56) References Cited

U.S. PATENT DOCUMENTS

| | | | |
|---|---|---|---|
| 2013/0242425 A1* | 9/2013 | Zayas | G11B 5/012 360/15 |
| 2014/0156718 A1 | 6/2014 | Chen | |
| 2014/0223084 A1 | 8/2014 | Lee et al. | |
| 2015/0199137 A1 | 7/2015 | Shin et al. | |
| 2015/0220274 A1 | 8/2015 | Lin et al. | |

\* cited by examiner

FIG. 5

| Description | Start Bit | Transmission Bit | Command Index | Argument | CRC7 | End Bit |
|---|---|---|---|---|---|---|
| Bit position | 47 | 46 | [45:40] | [39:8] | [7:1] | 0 |
| Width(bits) | 1 | 1 | 6 | 32 | 7 | 1 |
| Value | "0" | "1" | X | X | X | "1" |

FIG. 6

| CMD INDEX | Argument | Abbreviation |
|---|---|---|
| CMD44 | [31]Reliable Write Request<br>[30]DD:"1"read/"0"write<br>[29]Tag request<br>[28:25]Context ID<br>[24]:Forced Programming<br>[23]Priority:"0"simple/"1"high<br>[22:21]reserved<br>[20:16]Task ID<br>[15:0]Number of Blocks | QUEUED_TASK_PARAMS |
| CMD45 | [31:0]Start block address | QUEUED_TASK_ADDRESS |
| CMD46 | [31:21]reserved<br>[20:16]Task ID<br>[15:0]reserved | EXECUTE_READ_TASK |
| CMD47 | [31:21]reserved<br>[20:16]Task ID<br>[15:0]reserved | EXECUTE_WRITE_TASK |
| CMD48 | [31:21]reserved<br>[20:16]Task ID<br>[15:4]reserved<br>[3:0]TM op-code | CMDQ_TASK_MGMT |
| CMD13 | [31:16]RCA<br>[15]SQS<br>[14:1]stuff bits<br>[0]HPI | SEND_STATUS |

FIG. 7

| TM op-code | Description | Task ID Required? |
|---|---|---|
| 0h | Reserved | N/A |
| 1h | Discard entire queue:Device shall discard all tasks in the queue and QSR shall be cleared | no |
| 2h | Discard Task:Device shall discard designated task and QSR designated task shall be cleared | yes |
| 3h-Fh | Reserved | |

STORAGE DEVICE, SYSTEM INCLUDING THE SAME AND METHOD OF OPERATING THE SAME

CROSS-REFERENCE TO RELATED APPLICATION

This U.S. non-provisional patent application claims priority under 35 USC § 119 to Korean Patent Application No. 10-2016-0096759, filed on Jul. 29, 2016 in the Korean Intellectual Property Office (KIPO), the disclosure of which is incorporated by reference in its entirety herein.

BACKGROUND

1. Technical Field

Exemplary embodiments of the present disclosure relate generally to semiconductor integrated circuits. More particularly, exemplary embodiments of the present disclosure relate to a storage device, a system including a storage device, and a method of operating a storage device.

2. Discussion of the Related Art

Semiconductor memory devices may be classified into volatile memory devices and non-volatile memory devices. Volatile memory devices, such as dynamic random access memory (DRAM) devices, static random access memory (SRAM), etc. may lose the stored data when power is off. Non-volatile memory devices, such as flash memory, ferroelectric random access memory (FRAM), phase-change random access memory (PRAM), magnetic random access memory (MRAM), etc. may maintain stored data even though power is off. Particularly, the non-volatile memory devices such as the flash memory may have advantages of rapid programming speed, low power consumption, large memory capacity, etc. and thus are widely used as storage media in various fields requiring low power and large capacity storage devices such as MP3 players digital cameras, Solid State Drives (SSDs), embedded multimedia cards (eMMCs), computing systems, etc.

The eMMC using the non-volatile memory incorporates a controller and is mainly used in mobile products such as smartphones, tablet PCs, etc. Performance of a system using the storage device may be degraded as latency or a response time (e.g., corresponding to a delay time from service request of a host device to service answer of the storage device) is increased.

SUMMARY

Some exemplary embodiments of the present disclosure may provide a storage device capable of efficiently performing a write operation.

Some exemplary embodiments of the present disclosure may provide a system including a storage device capable of efficiently performing a write operation.

Some exemplary embodiments of the present disclosure may provide a method of operating a storage device capable of efficiently performing a write operation.

According to exemplary embodiments of the present disclosure, a method of operating a storage device includes receiving a write task from a host device. The method also includes storing the write task in a task queue included in the storage device. A write execution command is received from the host device. The method includes executing the write task in response to the write execution command. An internal management operation of the storage device is performed after the write task is stored in the task queue and before the write execution command is received.

According to exemplary embodiments of the present disclosure, a storage device includes a non-volatile memory device and a storage controller configured to control the non-volatile memory device. The storage controller includes a task queue configured to store a write task provided from a host device and status information of the write task. The storage controller also includes a processor configured to control the storage controller. The processor performs an internal management operation of the storage device after the write task is stored in the task queue and before a write execution command is received form the host device.

According to exemplary embodiments of the present disclosure, a system includes a host device and an embedded multimedia card (eMMC) controlled by the host device. The eMMC performs an internal management operation of the eMMC after a write task provided from the host device is stored in a task queue include in the eMMC and before a write execution command is received form the host device.

The storage device, the system and the associated method(s) according to exemplary embodiments may reduce the response time of the storage device (e.g., the response time to the write execution command) Additionally, the storage device, the system and the associated method(s) described herein may enhance performance of the system by performing the internal management operation such as the data backup operation during the queuing stage and the ready stage in advance before receiving the write execution command.

BRIEF DESCRIPTION OF THE DRAWINGS

Exemplary embodiments of the present disclosure will be more clearly understood from the following detailed description taken in conjunction with the accompanying drawings.

FIG. 5 is a diagram illustrating an example format of commands used in the system of FIG. 2.

FIG. 6 is a diagram illustrating an example definition of commands used in the system of FIG. 2.

FIG. 7 is a diagram illustrating an example of task management op-codes in the command definition of FIG. 6.

DETAILED DESCRIPTION OF THE EMBODIMENTS

Figure 1:
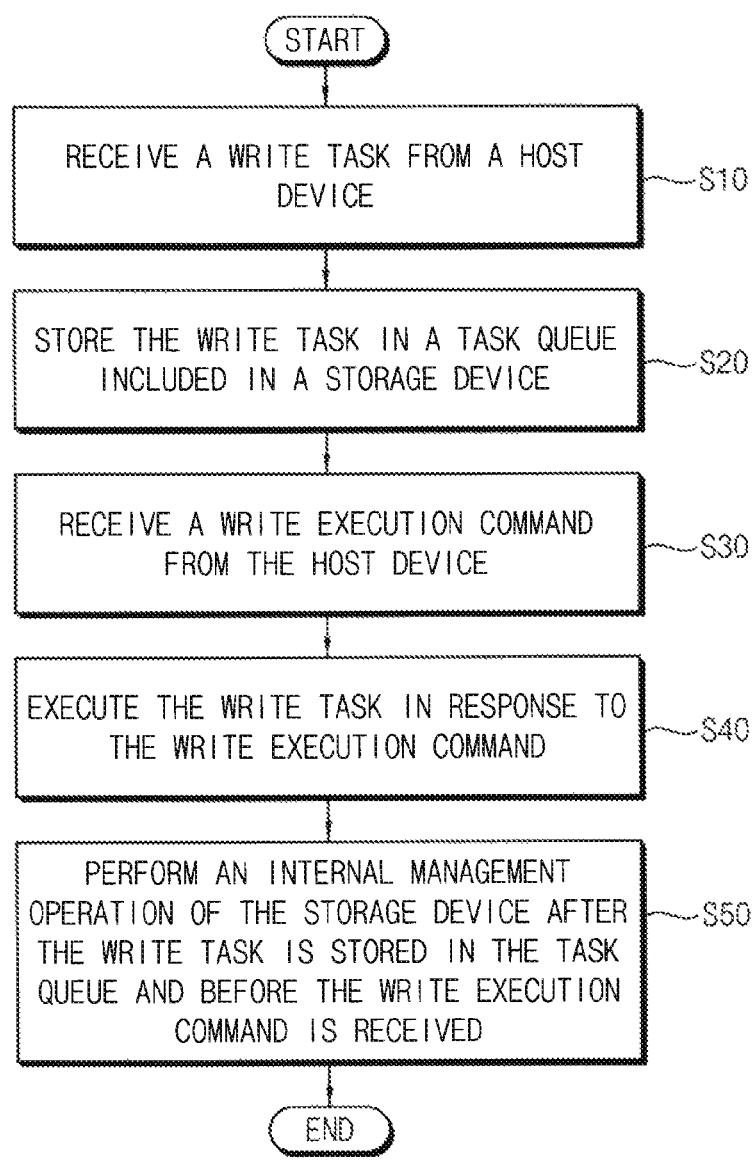
FIG. 1 is a flow chart illustrating a method of operating a storage device according to exemplary embodiments.

Various exemplary embodiments will be described more fully hereinafter with reference to the accompanying drawings, in which some exemplary embodiments are shown. In the drawings, like numerals refer to like elements throughout. The repeated descriptions may be omitted.

FIG. 1 is a flow chart illustrating a method of operating a storage device according to exemplary embodiments.

Referring to FIG. 1, a storage device receives a write task from a host device (S10). The write task may be provided from the host device to the storage device through at least one command as will be described below. The write task corresponds to a service request from the host device for storing write data from the host device in a storage region of the storage device.

The received write task is stored in a task queue included in the storage device (S20). A task queue described herein corresponds to a portion of a tangible storage medium that can store data. All forms of memory described herein are tangible and non-transitory during the time data is stored therein. As used herein, the term "non-transitory" is to be interpreted not as an eternal characteristic of a state, but as a characteristic of a state that will last for a period of time. Any memory described herein is an article of manufacture and/or machine component. Memories described herein are computer-readable mediums from which data and executable instructions can be read by, for example, a computer. The storage device may include the task queue to support command queuing and may store the write task using the task queue. Execution order of the stored tasks (e.g., the write task) may be adjusted depending on priorities of the tasks. The data bus may be operated efficiently by storing the tasks in the task queue in advance and then determining execution timing of the stored tasks.

The storage device receives a write execution command from the host device (S30), and executes the write task in response to the write execution command (S40). In exemplary embodiments, when the write task is ready for execution, the storage device may notify the host device of the ready status of the write task, and the host device may send the write execution command to the storage device after the host device checks (e.g., receives or even verifies) notification of the ready status.

As such, a write transaction between the host device and the storage device may include a queuing stage, a ready stage and an execution stage. In the queuing stage, the write task is transferred and stored in the task queue of the storage device. In the ready stage, the storage device determines whether the stored write task is ready for execution and notifies the host device of the ready status of the write task. In the execution stage, the host device sends the write execution command with the write data to the storage device, and the storage device executes the write task in response to the write execution command.

According to exemplary embodiments, the storage device may perform an internal management operation of the storage device after the write task is stored in the task queue and before the write execution command is received (S50).

In some exemplary embodiments, the internal management operation may include a data backup operation to store risk data in a backup region of the storage device. The risk data may include, for example, data to be damaged by execution of the write task among data stored in a storage region of the storage device. In other exemplary embodiments, the internal management operation may include a dummy write operation to write dummy data in a storage region of the storage device. The dummy write operation may be performed when the storage region has an error in stored data or when possibility of the error is determined. In still other exemplary embodiments, the internal management operation includes a write operation of meta data for control of the storage device.

If the data backup operation is performed after receiving the write execution command, the response time of the storage device to the write execution of the host device may be increased. When the dummy write operation and the write operation of the meta data are performed, the access of the host device to the storage device may be limited or otherwise hindered (e.g., slowed, delayed) if the storage device is in the busy state.

The method of operating the storage device according to exemplary embodiments may reduce the time taken by the storage device to respond to the write execution command. The method of operating the storage device may also enhance performance of the system by performing the internal management operations (e.g., the data backup operation) during the queuing stage and the ready stage in advance before receiving the write execution command.

The embedded multimedia card (eMMC), electrical standard version 5.1, i.e., JESD84-B51 published by the Joint Electron Devices Engineering Council (JEDEC) (http://www.jedec.org) in January 2015, is hereby incorporated by reference. Accordingly, unless otherwise defined, terms and definitions used herein have the same meaning as defined in JESD84-B51.

Figure 2:
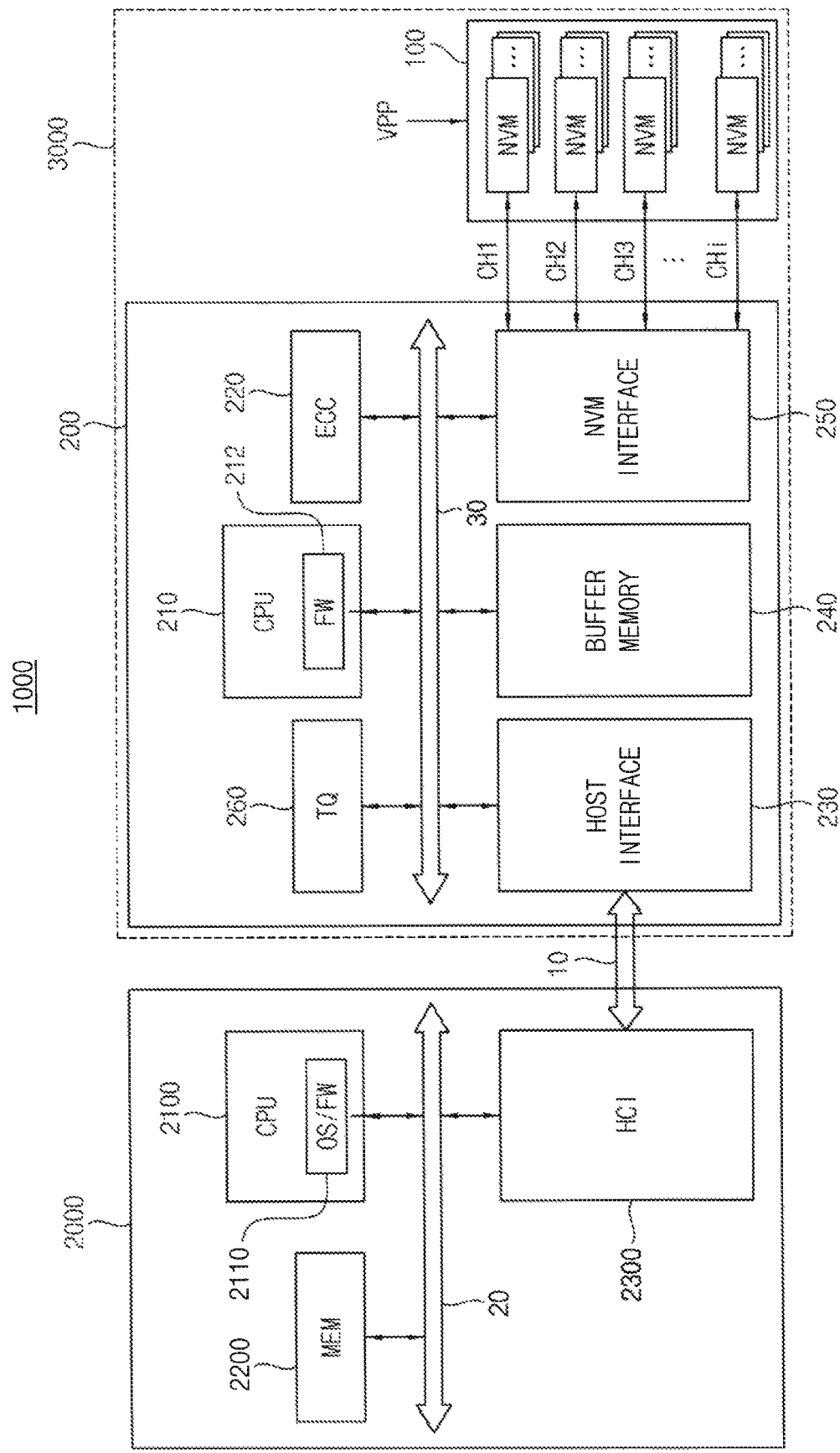
FIG. 2 is a block diagram illustrating a system including a storage device according to exemplary embodiments.
Figure 3:
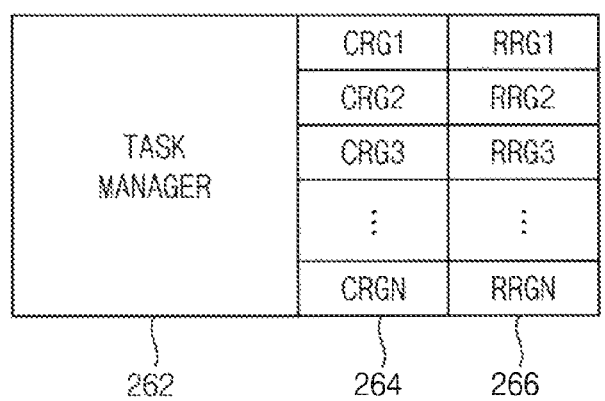
FIG. 3 is a diagram illustrating a task queue included in the storage device of FIG. 2.

FIG. 2 is a block diagram illustrating a system including a storage device according to exemplary embodiments. FIG. 3 is a diagram illustrating a task queue included in the storage device of FIG. 2.

Referring to FIG. 2, a system 1000 includes a host device 2000 and a storage device 3000. For example, the host device 2000 may be an embedded multimedia card (eMMC).

The host device 2000 may be configured to control data processing operations, such as data read operations and data write operations. The data processing operations may be performed at a single data rate (SDR) or a double data rate (DDR).

The host device 2000 may be a data processing device, such as a central processing unit (CPU), a processor, a microprocessor, or an application processor, which can process data. The host device 2000 and the storage device

3000 may be embedded or implemented in an electronic device. The system 1000 of FIG. 2 may be an arbitrary electronic device such as a personal computer (PC), a laptop computer, a mobile telephone, a smart phone, a tablet PC, a personal digital assistant (PDA), an enterprise digital assistant (EDA), a digital still camera, a digital video camera, an audio device, a portable multimedia player (PMP), a personal navigation device or portable navigation device (PND), an MP3 player, a handheld game console, or an e-book, etc.

When the system 1000 is an electronic device, the storage device 3000 may be electrically connected with other components of the system 1000 (electronic device) through connection means (e.g., pads, pins, buses, or communication lines) to communicate with the host device 2000.

The host device 2000 may include a processor (CPU) 2100, memory (MEM) 2200 and a host controller interface (HCI) 2300. Operating system (OS) and/or host firmware (FW) 2110 may be driven by the processor 2100. The host device 2000 may also include a clock generator (not shown), a state control unit (not shown), etc. The clock generator generates a clock signal used in the host 2000 and the storage device 3000. The clock generator may be implemented by a phase locked loop (PLL), for example.

The processor 2100 may include hardware and/or software for controlling generation of a command CMD, analysis of a response RES, storing of data in a register, e.g., an extended (EXT)_CSD register (not shown), of the storage device 3000, and/or data processing. The processor 2100 may drive the operation system and the host firmware 2110 to perform these operations.

The host controller interface 2300 may interface with the storage device 3000. For example, the host controller interface 2300 is configured to issue the command CMD to the storage device 3000, receive the response RES to the command CMD from the storage device 3000, transmit write data to the storage device 3000, and receive read data from the storage device 3000.

The storage device 300 may include multiple non-volatile memory devices (NVM) 100 and a storage controller 200.

The nonvolatile memory devices 100 may be optionally supplied with an external high voltage VPP. The nonvolatile memory devices 100 may be implemented with flash memory, FRAM, PRAM, MRAM, etc.

The storage controller 200 may be connected to the nonvolatile memory devices 100 through multiple channels CH1 to CHi. The storage controller 200 may include one or more processors 210, an ECC block 220, a host interface 230, a buffer memory 240, a nonvolatile memory interface 250 and a task queue 260. In some exemplary embodiments, the non-volatile memory devices 100 may include on-chip ECC engines (not shown), and in this case the ECC block 220 may be omitted.

The buffer memory 240 may store data used to drive the storage controller 200. Although FIG. 2 illustrates an example embodiment where the buffer memory 240 is included in the storage controller 200, the buffer memory 240 is not limited thereto. For example, the buffer memory 240 may be placed outside the storage controller 200.

The ECC block 220 may calculate error correction code values of data to be programmed at a writing operation, and may correct an error of read data using an error correction code value at a read operation. In a data recovery operation, the ECC block 220 may correct an error of data recovered from the nonvolatile memory devices 100. Although not shown in FIG. 2, a code memory may be further included to store code data needed to drive the storage controller 200. The code memory may be implemented by a nonvolatile memory device.

The processor 210 is configured to control overall operations of the storage controller 200. For example, the processor 210 may operate firmware 212 including a flash translation layer (FTL), etc. The FTL may perform various functions, e.g., address mapping, read calibration, error correction, etc.

The task queue 260 may store tasks (e.g., write tasks and read tasks provided from the host device 2000) and status information of the respective tasks. Although FIG. 2 shows that the task queue 260 is outside the host interface 230, the task queue 260 may be included in the host interface 230. The task queue 260 will be further described below with reference to FIG. 3.

The host interface 230 may provide an interface with external devices such as the host device 2000. The nonvolatile memory interface 250 may provide an interface with the nonvolatile memory devices 100.

The host device 2000 and the storage device 3000 may be connected through a bus 10. For example, the bus 10 in FIG. 2 may be an eMMC bus that is specified in JESD84-B51, including eleven signal lines or wires. The eMMC bus may include a clock line, a data strobe line, a bidirectional command signal line, a reset line and multiple data lines. However, the bus line 10 is not limited to an eMMC bus.

The clock line in the bus 10 may transmit a clock signal from the host device 2000 to the storage device 3000. The bidirectional command signal line in the bus 10 may transmit the command from the host device 2000 to the storage device 3000 and transmit the response to the command from the storage device 3000 to the host device 2000. A bidirectional data line in the bus 10 may transmit write data for data write operations from the host device to the storage device 3000. The bidirectional data line in the bus 10 may also transmit read data for data read operations from the storage device 3000 to the host device 2000. The data strobe line in the bus 10 may transmit a data strobe signal from the storage device 3000 to the host device 2000. The data strobe signal may be a clock signal synchronized with data transmitted from the storage device 3000 to the host device 2000, for example. The host device 2000 may transmit a hardware reset signal to the storage device 3000 through the reset line in the bus 10.

Referring to FIG. 3, the task queue 260 may include a task manager 262, a task storage 264 and a status storage 2600.

The task manager 262 is configured to manage the task storage 264 and the status storage 266. For example, if the host device 2000 transfers particular commands such as task set command CMD44 and a task address command CMD45 as will be described below, the task manager 262 may store the task represented by the command in the task storage 264. The tasks to be stored in the task storage 264 may be issued by the host device 2000 regardless of idle, transmission, reception or busy state of the data bus.

The task manager 262 may store status of each stored task in the status storage 266. The task manager 262 may efficiently manage the data transferred between the host device 2000 and the storage device 3000. The task manager 262 may provide information of the task ready for execution or the ready task to the host device 2000, either according to the request of the host device 2000 or actively regardless of the request from the host device 2000.

The task manager 262 may manage preparation or parallel processing of multiple (at least two) tasks stored in the task storage 264. With respect to the tasks stored in the task storage 264, the task manager 262 may enable parallel processing. For example, the task manager 262 may perform an operation necessary for data processing for a task that has not been completed or prepare data using an interleaving operation of the non-volatile memory device 100. Therefore, performance (e.g., write or read operation performance) of the storage device 3000 may be increased (improved).

As illustrated in FIG. 3, the task storage 264 may include multiple task registers CRG1~CRGN, where N is a natural number indicating a size of a number of the task registers CRG1~CRGN. N may be referred to as a multi-queue depth.

The storage device 3000 may store tasks up to N tasks corresponding to the multi-queue depth N. Each of the task registers CRG1~CRGN may store task information including a task ID, transfer direction information, data size information, and a start address, for example. The task information may also include priority information. The task information may be contained as an argument in a command transmitted from the host device to the storage device 3000, as will be described below.

The task manager 262 may control the order of task execution based on the priority information and/or the transfer direction information. For example, the task manager 262 may control the order of task execution such that a task with a higher priority is executed before another task with a lower priority, or such that a read task is executed before a write task.

As illustrated in FIG. 3, the status storage 266 may include multiple status registers RRG1~RRGN. Each of status registers RRG1~RRGN stores the status information of the tasks stored in the task registers CRG1~CRGN, respectively.

The task manager 262 may manage the task registers CRG1~CRGN that store tasks (i.e., the occupied task registers). The task manager 262 may update the status register RRGi (i=1~N) with "ready" information after completing an internal operation necessary for execution of the task stored in the corresponding task register CRGi.

For example, the status registers RRG1~RRGN stores N-bit status information. First through N-th bits stored in the status registers RRG1~RRGN indicate the status of tasks (referred to herein as first through N-th tasks for the sake of convenience), respectively, stored in the respective first through N-th task registers CRG1~CRGN. For example, the first bit (e.g., least significant bit (LSB)) stored in the status register RRG1~RRGN indicates whether the first task is ready for execution (hereinafter, referred to as a "ready" status) or is not ready for execution (hereafter, referred to as a "not-ready" status). The N-th bit (e.g., most significant bit (MSB)) indicates whether the N-th task is in the ready status or the not-ready status.

The initial values stored in the status registers RRG1~RRGN may be all "0," for example. When one of the first through N-th tasks is in the ready status, a bit in the status register corresponding to that task is changed to "1." The task manager 262 checks the status of each of tasks stored in the task registers CRG1~CRGN, and updates a corresponding bit in the status register.

Although the above embodiment provides a single bit in the status register being mapped to each task, it is understood that two or more bits may be mapped to each task in other embodiments, without departing from the scope of the present teachings. In other words, the status of each task may be represented by multiple (i.e., at least two) bits. For example, two bits may be allocated for each task, so that the task can be expressed as one of four statuses, e.g., idle, busy, ready and error statuses. Likewise, the number of bits for the status of each task may be extended to three or more.

Although the task storage 264 and the status storage 266 are shown to be implemented using the task registers CRG1~CRGN and the status registers RRG1~RRGN in FIG. 3, the task storage 264 and status storage 266 are not restricted to these configurations. For example, the task storage 264 alternatively may be implemented using a queue or slot, or as memory such as static random access memory (SRAM) or dynamic random access memory (DRAM). Tasks received from the host device 2000 may be sequentially stored in the task storage 264, but tasks may be executed in an order different than the sequence in which the tasks are stored. For example, the order of executing tasks may be determined according to the priority of the tasks rather than the time in which the tasks are stored, respectively.

Figure 4:
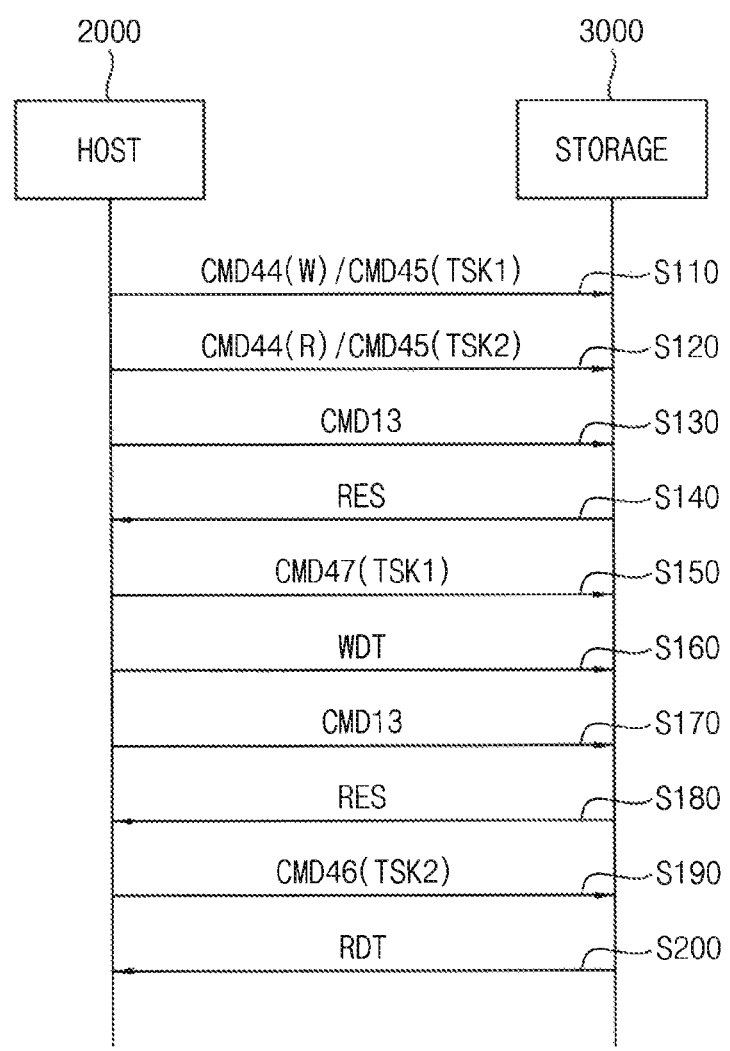
FIG. 4 is a flow chart for describing a write operation and read operation according to command queuing by the system of FIG. 2.

FIG. 4 is a flow chart for describing a write operation and read operation according to command queuing by the system of FIG. 2. FIG. 5 is a diagram illustrating an example format of commands used in the system of FIG. 2. FIG. 6 is a diagram illustrating an example definition of commands used in the system of FIG. 2. FIG. 7 is a diagram illustrating an example of task management op-codes in the command definition of FIG. 6.

Referring in advance to FIG. 5, all commands have a fixed code length of 48 bits, needing a transmission time of 0.92 micro seconds at 52 MHz. A command always starts with a start bit (always '0'), followed by the bit indicating the direction of transmission (host='1'). The next 6 bits indicate the index of the command; this value being interpreted as a binary coded number (between 0 and 63). Some commands need an argument (e.g., an address), that is coded by 32 bits. In FIG. 5, a value denoted by 'x' indicates a variable value for a binary coded number within a range that varies according to the number (width) of bits carrying values of "0" or "1", and this variable is dependent on the command. All commands are protected by a CRC, and in FIG. 5 the CRC protection is provided by CRC7. Every command codeword is terminated by the end bit (always '1'). Some commands specified by JESD84-B51 are illustrated in FIG. 6. Each command is issued from the host device 2000 to the storage device 3000.

Referring to FIGS. 2 through 7, the host device 2000 transmits a first queuing command that includes a task set command CMD44 and a task address command CMD45 as a first task TSK1 to the storage device 3000 in operation S110 in FIG. 4. The host device 2000 may transmit the task set command CMD44 and the task address command CMD45 to the storage device 3000 even while previous data is being transmitted through the data bus. The data bus may be a portion of the bus 10 in FIG. 2.

The task set command CMD44 is a command for setting the ID of a task and the operating direction (direction information W) of the task. The operating direction is the transfer direction of data. For example, the task set command CMD44 may include a task ID, a data direction DD and size information in an argument such as a 32-bit argument. The data direction may indicate the data transfer direction. The size information (i.e., the number of blocks) may designate the size of data to be written to a flash memory or data to be read from the flash memory.

In some embodiments, among the 32-bit argument of the task set command CMD44, the lower 16 bits [15:0] may represent the data size with the number of blocks. The following lower 5 bits [20:16] may represent the task ID. The bit [23] may represent priority, and the bit [30] may represent the data direction DD. Here, a block is a unit of data having a predetermined size and may be a page of the flash memory or a multiple of a page, although a block in the present disclosure is not restricted to these examples.

For example, the bit [30] being set to "0" indicates that the current task is a write task for storing data in the storage device 3000. The bit [30] being set to "1" indicates that the current task is a read task for reading data from the storage device 3000. In various embodiments, the write task and the read task are identified by different settings in the argument of one command CMD44. However, a command for the write task and a command for the read task may be defined separately in other embodiments. Also, in various embodiments, the priority is represented using one bit, i.e., the priority bit [23]. However, the priority may be represented using two or more bits in other embodiments.

The task address command CMD45 may include start address information (e.g. data block address) indicating the start address of data corresponding to the current task. The start address may be a logical address. For example, when the task is the write task, the start address information designates the start address of data to be written to the non-volatile memory device 100. When the task is the read task, the start address information designates the start address of data to be read from the non-volatile memory device 100. For example, when the task is the read task, the start address is "100" and the data size is "10", the task includes reading 10 blocks of data starting from address "100".

Although the task address command CMD45 including the start address information is defined separately from the task set command CMD44 in the embodiments, it is understood that the data size information and the start address information may be included together in one command or the other, e.g., in the task set command CMD44, in alternative embodiments.

The storage device 3000 may receive a command from the host device 2000 and store task information in the task registers CRG1~CRGN by task ID. For example, the storage device 3000 receives the task set command CMD44 for the first task TSK1 from the host device 2000 and stores task information about the first task TSK1 in one (e.g., first task register CRG1) of the task registers CRG1~CRGN in the task storage 264. Commands received from the host device 2000 may be sequentially stored in the task registers CRG1~CRGN, although the tasks may not necessarily be executed in order in which the commands have been stored. For example, the execution order of tasks may be determined according to the respective priorities of the tasks.

The storage device 3000 may also receive the task address command CMD45 for the first task TSK1 from the host device 2000. The storage device 3000 may store the start address information in the task register, e.g., first task register CRG1, corresponding to the first task TSK1. The host device 2000 transmits a second queuing command that includes the task set command CMD44 and the task address command CMD45 for another task, i.e., a second task TSK2, to the storage device 3000 in operation S120. The task set command CMD44 and the task address command CMD45 for the second task may be transmitted before transmitting and/or receiving data in response to the first task TSK1 to or from the storage device 3000. The storage device 3000 may receive the task set command CMD44 for the second task TSK2 from the host device 2000 and store task information about the second task TSK2 in another one (e.g., second task register CRG2) of the task registers CRG1~CRGN in the task storage 264. The storage device 3000 may also receive the task address command CMD45 for the second task TSK2 from the host device 2000, and store start address information in the task register (e.g., second task register CRG2), corresponding to the second task TSK2. In the embodiment illustrated in FIG. 4, the first task TSK1 is a write task and the second task TSK2 is a read task, although the concepts and tasks described herein are not restricted to this implementation.

Thereafter, the host device 2000 sends the storage device 3000 a status check command for checking a status in the status registers RRG1~RRGN in operation S130. The status check command is defined to check the ready status of a task stored in each of the task registers CRG1~CRGN. As shown in FIG. 4, the host device 2000 may use CMD13 as the status check command. For example, a predetermined bit (e.g., bit [15]) in an argument of CMD13 may be set to "1" to use CMD13 as the status check command.

In response to the status check command CMD13, the storage device 3000 sends the host device 2000 a status response message RES, including values in the status storage 266, in operation S140. The host device 2000 detects the ID of a task that has been ready for execution in the status response message RES. The status response message RES may include an argument of 32 bit values of the status storage 266, that is, the status registers RRG1~RRGN. Among the 32 bit values of the status register 313A, value "1" may indicate a ready task. The host device 2000 may identify tasks corresponding to value "1" among the bits of the status registers RRG1~RRGN.

Once the host device 2000 confirms that the first task TSK1 is ready from the status response message RES received in operation S140, the host device 2000 sends the storage device 3000 an execution command, such as a write execution command CMD47, for the first task TSK1 in operation S150. The host device 2000 transmits write data WDT related to the first task TSK1 to the storage device 3000 in operation S160. In response to the write execution command CMD47, the storage device 3000 receives and stores the write data WDT in the buffer memory 240. The storage device 3000 also sends a program command to the non-volatile memory 100 so that the write data WDT stored in the buffer memory 240 is programmed to the non-volatile memory 100.

The host device 2000 may periodically or non-periodically send the status check command CMD13 to the storage device 3000 in order to check the status of the status registers RRG1~RRGN. For example, the host device 2000 sends the status check command CMD13 to the storage device 3000 in operation S170. In response to the status check command CMD13 at S170, the storage device 3000 sends the host device 2000 the status response message RES including the values of the status registers RRG1~RGN in operation S180.

Once the host device 2000 confirms that the second task TSK2 is ready from the status response message RES received in operation S180, the host device 2000 sends the storage device 3000 another execution command, such as a read execution command CMD46, for the second task TSK2 in operation S190. In response to the read execution command CMD46, the storage device 3000 transmits read data RDT related to the second task TSK2 to the host device 2000 in operation S200.

Referring to FIG. 6, other illustrative execution commands include a task management command CMD48 for managing tasks. The status check command CMD13 is for checking status in the status registers, as described above. The task management command CMD48 is defined to manage or control tasks stored in the task storage 264. The task management command CMD48 may cancel a particular task or all tasks. The task management command CMD48 may also be used to re-execute, i.e., retry a particular task.

The task management command CMD48 may include a task ID and a task management code, e.g., TM op-code, in an argument. Bits [3:0] may be allocated for the TM op-code, but the bit arrangement and TM op-code are not restricted thereto.

Referring to FIG. 7, when the TM op-code is set to "1h", all tasks stored in the task storage 264 are cancelled or discarded. When the TM op-code is set to "2h", only a particular task (e.g., a task corresponding to a task ID included in the task management command CMD48) among all tasks stored in the task storage 264 is discarded. Other values of the TM op-code are reserved in the embodiments illustrated in FIG. 7, but each of the values may be defined to designate a particular managing operation. Consequently, the task management command CMD48 may be used to manage or control at least one task, such as to re-execute a particular task or to change the priority of the task.

The commands CMD44 and CMD45 may be paired for a single task, issued to the storage device 3000 regardless of data transfer, and stored in the task storage 264. When a task that is ready among tasks stored in the task storage 264 is a read task, the task may be designated and a read operation may be executed using CMD46. When the task that is ready is a write task, the task may be designated and a write operation may be executed using CMD47.

Figure 8:
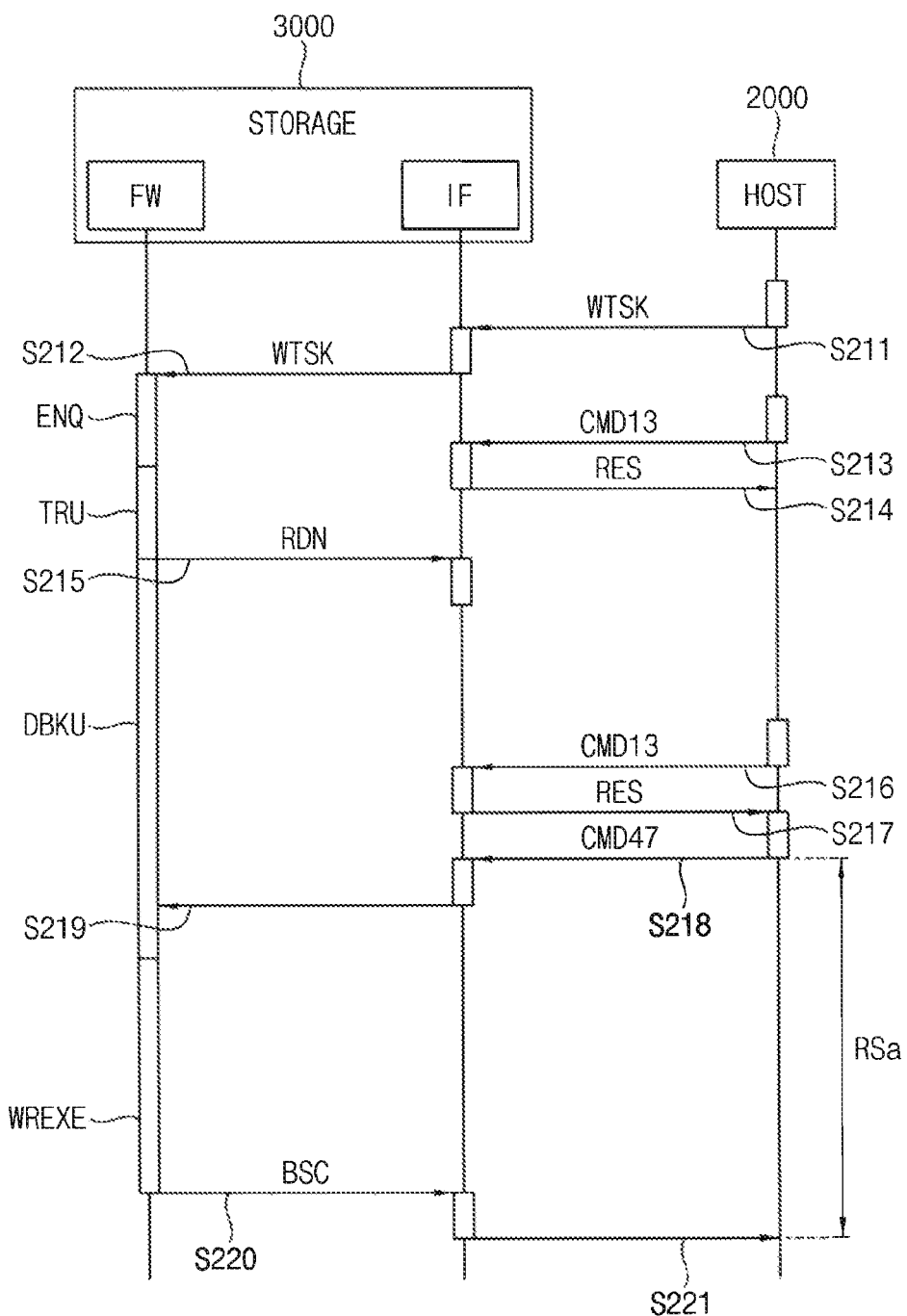
FIG. 8 is a flow chart illustrating a method of operating a storage device according to an example embodiment.

FIG. 8 is a flow chart illustrating a method of operating a storage device according to an example embodiment.

Signal transfers may be performed between the host device 2000 and the storage device 3000 as described with reference to FIGS. 2 through 7, and hereinafter the repeated descriptions may be omitted. Each of the firmware FW and the host interface IF of the storage device 3000 may include a request queue for storing tasks, respectively. Hereinafter, the queue of the firmware is referred to as a firmware queue FWQ. The queue of the host interface IF corresponds to the above described task queue TQ. For example, the firmware queue FWQ may be a portion of a storage region in the storage device 3000. The task queue TQ may be implemented with the task registers as described above.

FIG. 8 illustrates an example embodiment that the firmware executed by the processor 210 in the storage device 3000 determines whether the write task is ready for execution.

Referring to FIG. 8, the host device 2000 transfers the write task WTSK to the storage device 3000 (S211). Then the host interface IF of the storage device 3000 stores the write task WTSK and transfers the write task WTSK to the firmware FW (S212). The write task WTSK may be transferred from the host device 2000 to the storage device 3000 through the commands CMD44 and CMD45, as described above.

If the host interface IF transfers the write task WTSK to the firmware FW, the firmware FW may store the write task WTSK in the firmware queue FWQ (ENQ). As such, the task queue TQ of the host interface IF may transfer the write task WTSK to the processor 210 and the firmware FW executed by the processor 210 may store the write task WTSK in the firmware queue FWQ.

The host device 2000 transmits the status check command CMD13 to the storage device 3000 (S213). The host interface IF transfers the status response message RES indicating whether the write task WTSK is ready for execution to the host device 2000 (S214). When the write task WTSK is not ready for execution, the status response message RES may indicate the non-ready status of the write task WTSK.

When the write task WTSK is ready for execution, the firmware FW performs a task ready upgrade (TRU) and transfers a ready status notice RDN to the host interface IF (S215). The host interface IF upgrades the status information in the task queue TQ.

Thereafter, the firmware FW performs a data backup operation (DBKU) according to exemplary embodiments. The data backup operation is storing risk data in a backup region of the storage device 3000. The risk data is data that is likely or certain to be damaged by execution of the write task among data stored in a storage region of the storage device 3000. The data backup operation will be described below with reference to FIGS. 9 through 14.

The host device 2000 retransmits the status check command CMD13 to the storage device 3000 (S216). Then host interface IF resends the status response message RES indicating the state of the write task WTSK to the host device 2000 (S217). As such, the host device 2000 may send the status check command CMD13 repeatedly to the storage device 3000 until the host device 2000 receives a ready notice informing that the write task WTSK is ready for execution.

After receiving the response (ready notice) at S217, the host device 2000 transmits the write execution command CMD47 to the storage device 3000 (S218). The write execution command CMD47 is transferred to the firmware FW through the host interface IF (S219) and the firmware FW performs the write operation (WREXE) after the data backup operation (DBKU) is completed.

When the write operation (WREXE) is completed, the firmware FW issues a busy clear notice BSC (S220). The busy clear notice BSC is then transferred to the host device 2000 through the host interface IF (S221).

As described above, the firmware FW executed by the processor 210 may determine whether the write task WTSK is ready for execution. When the write task WTSK is ready for execution, the firmware FW may inform the ready state of the write task WTSK and then perform the internal management operation, that is, the data backup operation. The task queue TQ may update the status information of the write task WTSK in response to the ready status notice RDN from the firmware FW (i.e., based on or in association with S215).

The response time RSa of the storage device 3000 to the write execution command CMD47 from the host device 2000 at S217 may be defined as a time interval between an issuance of the write execution command CMD47 by the host device 2000 at S217 to reception of the busy clear notice BSC by the host device 2000 at S221.

As such, the storage device, the system and the associated method according to exemplary embodiments of the present disclosure may reduce the response time of the storage device to the write execution command. As a result, performance of the system is enhanced by performing the internal management operation such as the data backup operation during the queuing stage and the ready stage in advance before receiving the write execution command.

Figure 9:
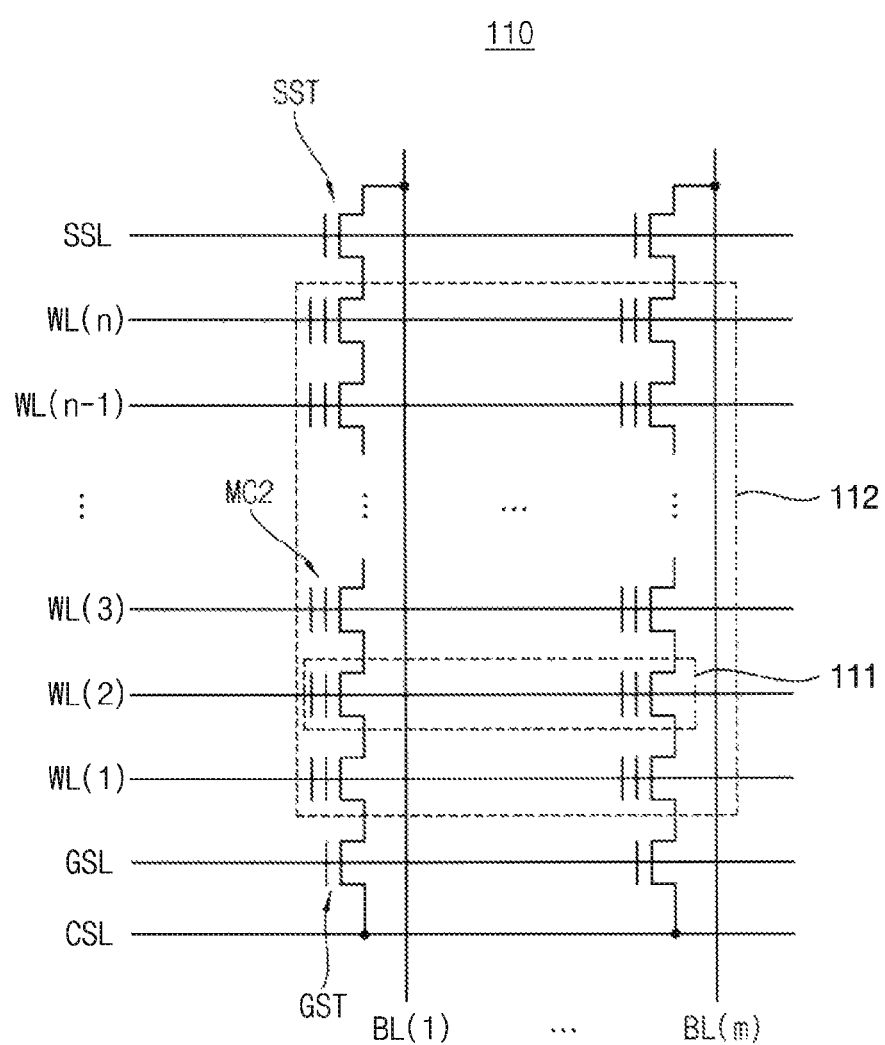
FIG. 9 is a circuit diagram illustrating an example of a non-volatile memory cell array included in the storage device in FIG. 2.

FIG. 9 is a circuit diagram illustrating an example of a non-volatile memory cell array included in the storage device in FIG. 2.

Referring to FIG. 9, the memory cell array 100 may include string select transistors SST, ground select transistors GST and multiple memory cells MC2. The string select transistors SST may be connected to bitlines BL(1), BL(m), and the ground select transistors GST may be connected to a common source line CSL. The memory cells MC2 may be connected in series between the string select transistors SST and the ground select transistors GST. Memory cells in the same row may be connected to the same wordline among wordlines WL(1), WL(n). For example, 16, 32 or 64 wordlines may be disposed between a string select line SSL and a ground select line GSL.

The string select transistors SST may be connected to the string select line SSL, and may be controlled by a voltage on the string select line SSL. The ground select transistors GST may be connected to the ground select line GSL, and may be controlled by a voltage on the ground select line GSL. The memory cells MC2 may be controlled by a voltage on the wordlines WL(1), WL(n). In the NAND flash memory device including the memory cell array 100, a read operation and a program operation may be performed per page 111, and an erase operation may be performed per block 112. During the program operation, a bulk voltage having a level of about 0 volt may be applied to a bulk substrate of the NAND flash memory device.

The non-volatile memory device included in the storage device 3000 in FIG. 2 is not limited to the configuration of FIG. 9. The non-volatile memory device may have various configurations such as NOR-type NAND flash, three-dimensional (or vertical) NAND flash, and the like.

Figure 10:
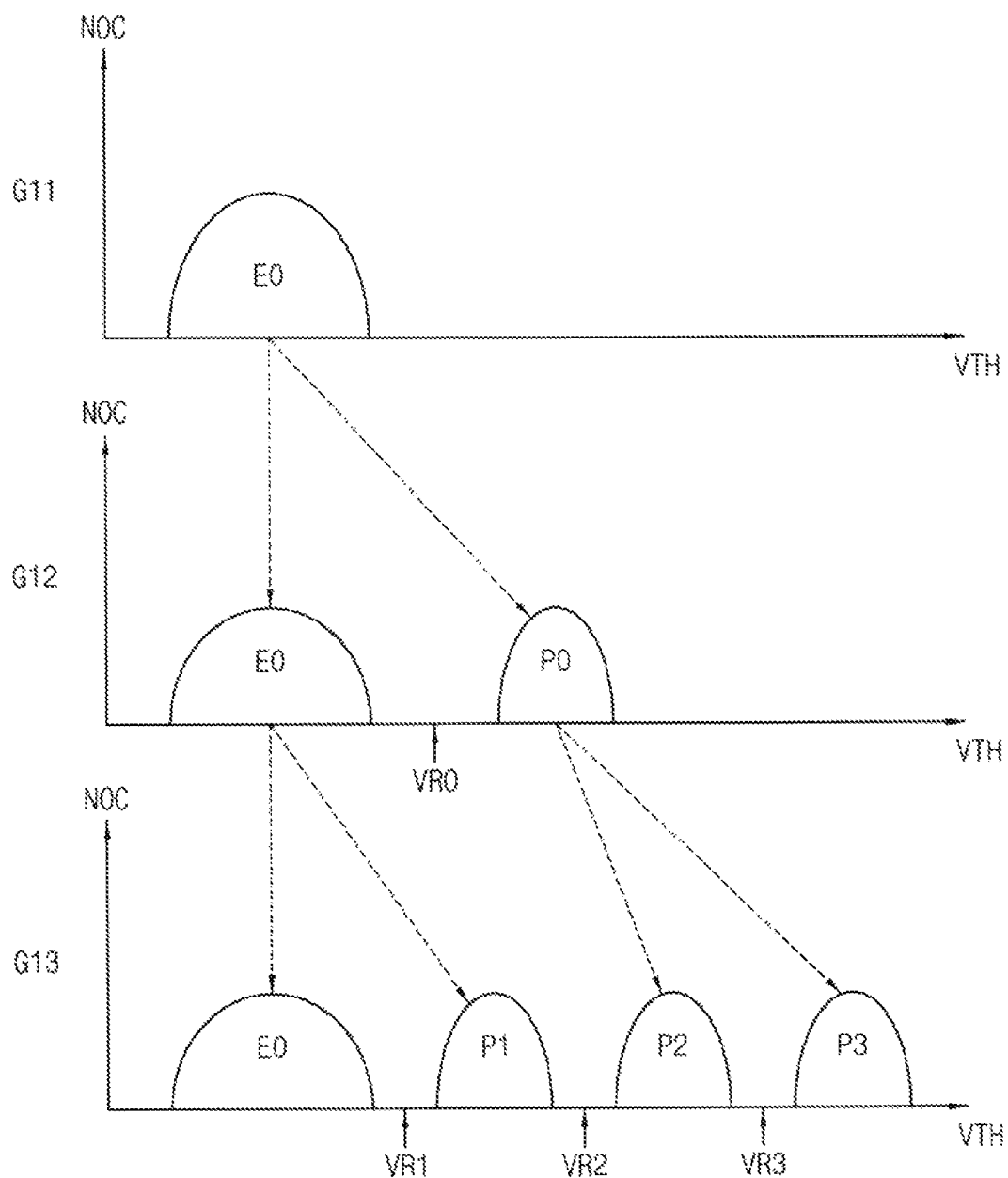
FIG. 10 is a diagram for describing change in states of multi-level cells when the write operation is performed normally.

FIG. 10 is a diagram for describing change in states of multi-level cells when the write operation is performed normally.

As an example, FIG. 10 illustrates distribution of threshold voltages of multi-level cells according a to 2-bit program. Hereinafter, it is assumed that a first-programmed page programmed by the flash memory device is a least significant bit (LSB) page that is programmed during a LSB program operation. Additionally, it is assumed that a second-programmed (after the first-programmed) page programmed by the flash memory device is a most significant bit (MSB) page that is programmed during a MSB program operation. Hence, in the graphs of FIG. 10, the horizontal axis indicates threshold voltage and the vertical axis indicates a number of cells.

Referring to FIG. 10, as shown in a first graph G11, the threshold voltage distribution of cells connected to a selected word line is in an erase state E0 before a program operation is performed. Thereafter, when the LSB program operation is performed on the cells connected to the selected word line, the threshold voltage distribution shifts from the erase state E0 to an LSB program state P0, as shown in a second graph G12. The two states E0 and P0 may be read out using one read voltage VR0. Thereafter, when the MSB program operation is performed on the selected word line, the threshold voltage distribution shifts from the erase state E0 to a program state P1, and from the LSB program state P0 to program states P2 and P3, as shown in a third graph G13. When the LSB page and the MSB page are completely programmed to the selected word line, the cells connected to the selected word line have four threshold voltage distributions. The four states E0, P1, P2 and P3 may be read out using three read voltages VR1, VR2 and VR3.

Figure 11:
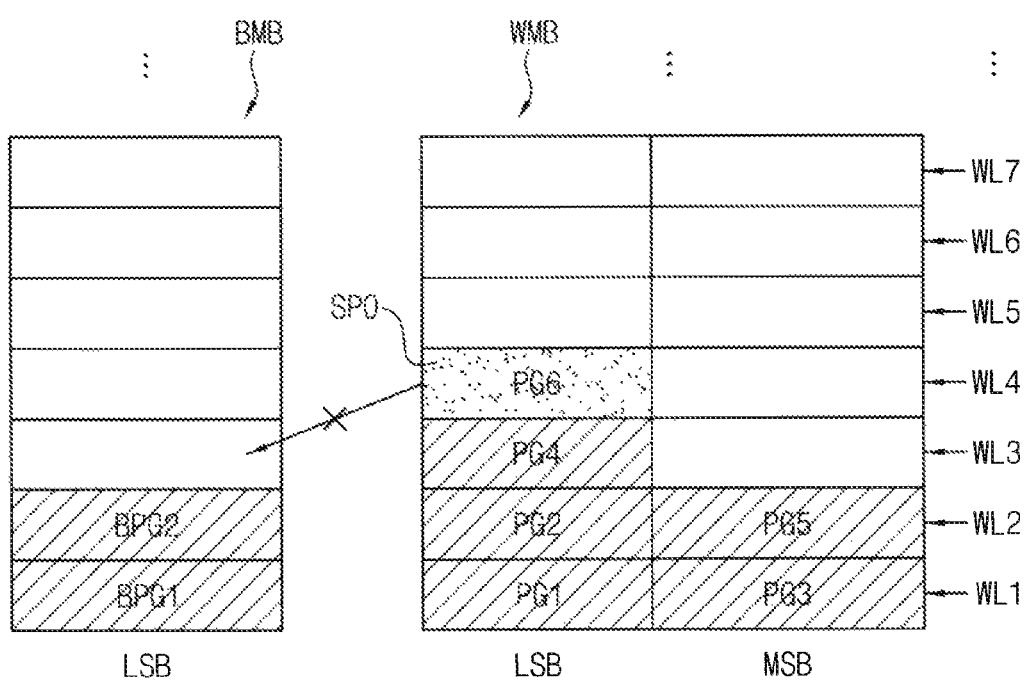
FIG. 11 is a diagram for describing a case that a sudden power-off occurs during a write operation of a least significant bit page of multi-level cells.
Figure 12:
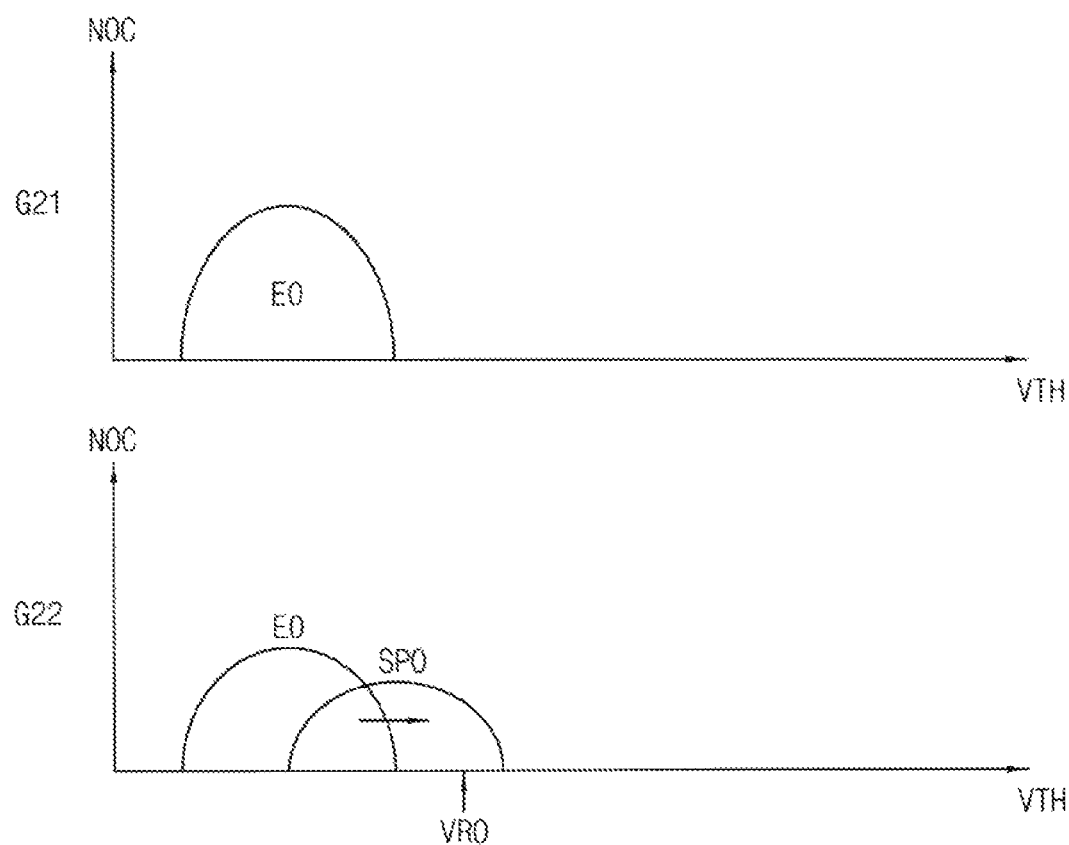
FIG. 12 is a diagram for describing change in states of multi-level cells when a sudden power-off occurs during a write operation of a least significant bit page.

FIG. 11 is a diagram for describing a case that a sudden power-off (i.e., when power supply is suddenly stopped) occurs during a write operation of a least significant bit page of multi-level cells. FIG. 12 is a diagram for describing changes in states of multi-level cells when a sudden power-off occurs during a write operation of a least significant bit page.

If an abnormal situation such as a sudden power-off (SPO) occurs during the programming operation, the memory cell may not be programmed properly to a targeted state, and the distribution of the threshold voltage may be distorted. In this case, a read error may be caused such that the state different from the targeted state of the memory cell is read out. Accordingly, it is required in the memory device to verify the program result and correct any errors.

Referring to FIG. 11, for example, data corresponding to two pages may be stored in each of the wordlines WL1~WL7 in a write memory block WMB. FIG. 11 shows an example that the program operations have been performed for six pages PG1~PG6 and the index of the pages PG1~PG6 indicates the programming order. For example, programming of the MSB page PG5 of the second word line WL2 is in the fifth place in the multi-level cell (MLC) program sequence. Programming of the LSB page PG6 of the fourth word line WL4 comes next, i.e., the sixth place in the MLC program sequence. As such, the LSB program operation and the MSB page operation are alternately performed between an upper word line and a lower word line. Program offsets are predetermined and MLC program operations are performed according to the program offsets. When the MLC program operations are performed according to the program offsets, interference and coupling effects between adjacent wordlines can be minimized Referring to FIG. 11, a sudden power-off (SPO) occurs while the LSB page PG6 of the word line WL4 is being programmed. When the sudden power-off occurs, power supply is abruptly cut off and the programming of constituent memory cells is interrupted, possibly before being completed. As a result, the threshold voltage distribution of last-programmed memory cells connected to the last-programmed word line experiencing the sudden power-off may not be properly disposed in the erase state and/or any one of the program states. Instead, at least some of the last-programmed memory cells may be placed in a soft (errant) program state.

Referring to FIGS. 11 and 12, the threshold voltage distribution of the memory cells of the selected word line, that is, the fourth wordline WL4 experiencing the sudden power-off, is in the erase state E0 before a program operation is performed as shown in a first graph G21 in FIG. 12. The threshold voltage distribution of the memory cells connected to the selected word line WL4, when the LSB program operation on the selected word line WL4 is interrupted due to the sudden power-off, is shown in a second graph G22. The threshold voltage distribution of the memory cells connected to the selected word line WL4 is in a soft program state SPO due to the interruption of programming as shown in the second graph G22 in FIG. 12. Because the sudden power-off occurs before the programming is completed, the host device 2000 may retry the interrupted program of the sixth page PG6 after power is recovered.

Figure 13:
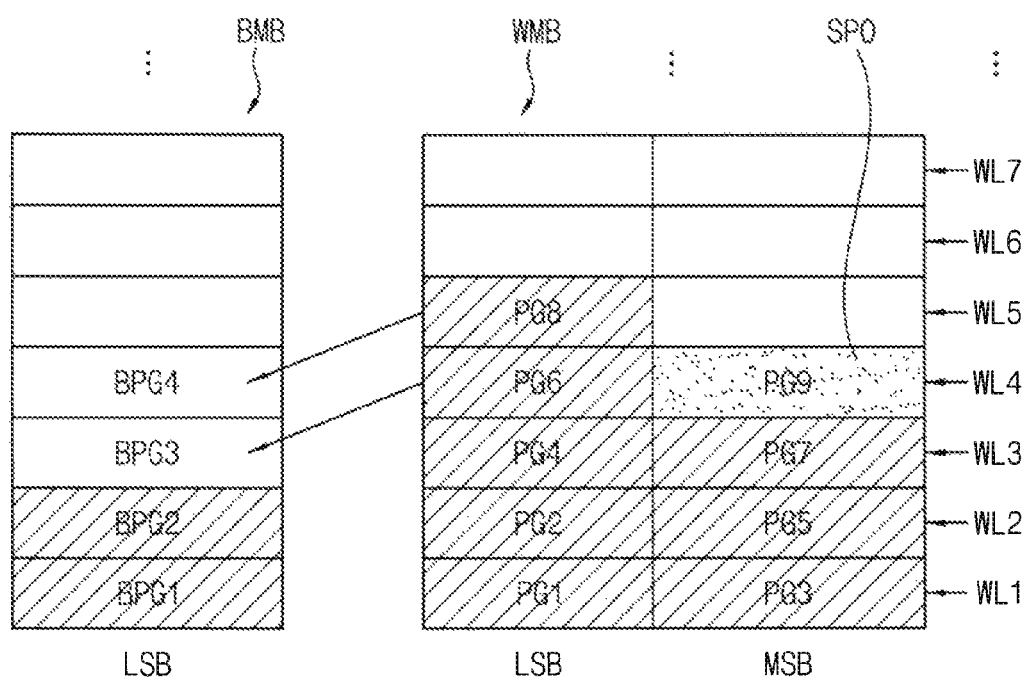
FIG. 13 is diagram for describing a case that a sudden power-off occurs during a write operation of a most significant bit page of multi-level cells.
Figure 14:
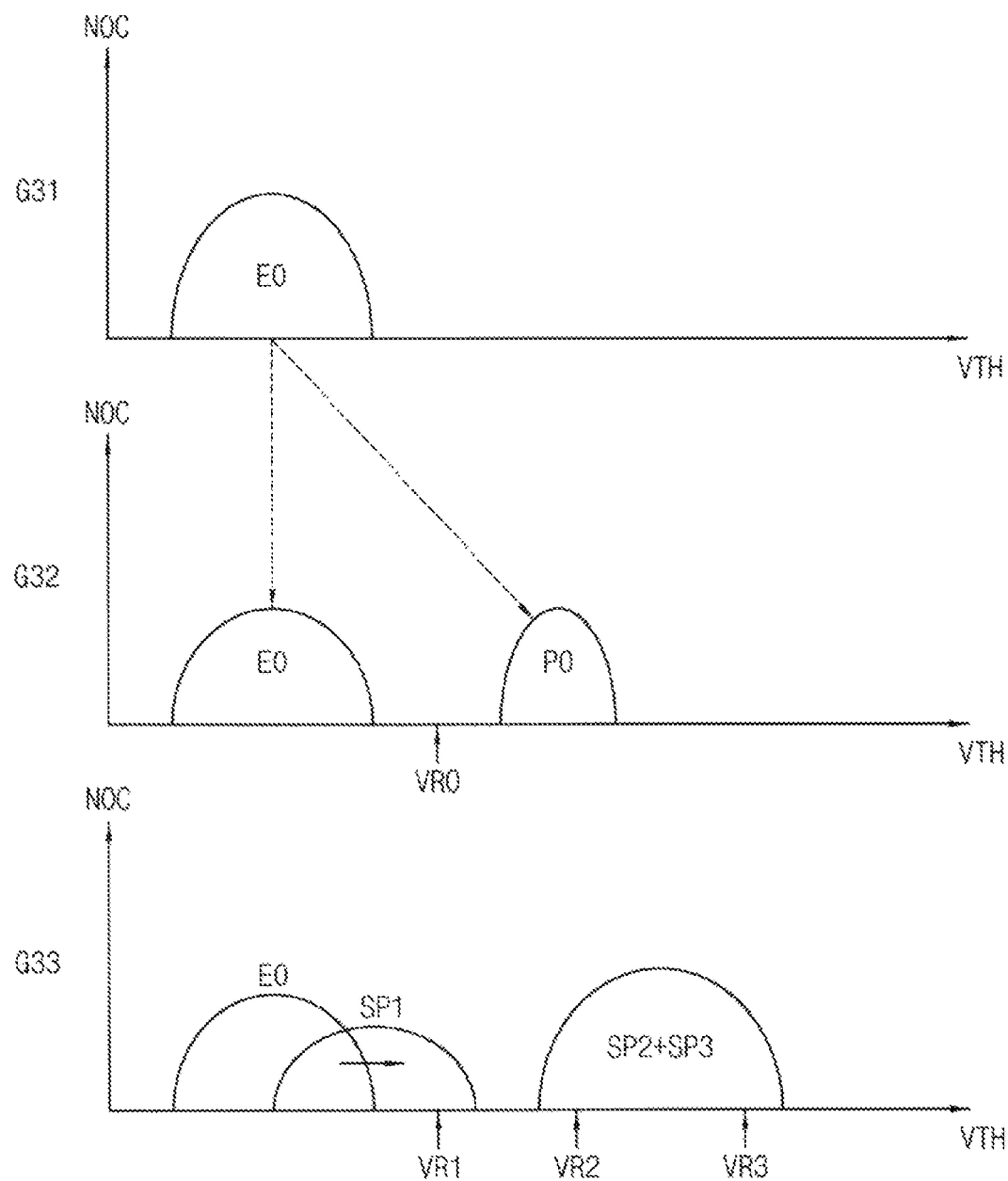
FIG. 14 is a diagram for describing change in states of multi-level cells when a sudden power-off occurs during a write operation of a most significant bit page.

FIG. 13 is diagram for describing a case that a sudden power-off occurs during a write operation of a most significant bit page of multi-level cells. FIG. 14 is a diagram for describing change in states of multi-level cells when a sudden power-off occurs during a write operation of a most significant bit page.

FIG. 13 shows an example that the program operations have been performed for nine pages PG1~PG9 and the index of the pages PG1~PG9 indicates the programming order. In addition, FIG. 13 shows an example that a sudden power-off occurs while the MSB page PG9 of the word line WL4 is being programmed.

Referring to FIGS. 13 and 14, the threshold voltage distribution of the memory cells of the selected word line, that is the fourth wordline WL4 experiencing sudden power-off, is in the erase state E0 before a program operation is performed as shown in a first graph G31 in FIG. 14. When the LSB program operation on the selected word line WL4 is performed, the threshold voltage distribution moves from the erase state E0 to the programmed state P0 as illustrated in a second graph G32 in FIG. 14. The threshold voltage distribution of the memory cells connected to the selected word line WL4, when the MSB program operation on the selected word line WL4 is interrupted due to the sudden power-off, is shown in a third graph G33 in FIG. 14. The threshold voltage distribution of the cells connected to the selected word line WL4 is in soft program states SP1, SP2 and SP3 due to the interruption of programming as shown in the third graph G33. Because the sudden power-off occurs before the programming is completed, the host device 2000 may retry the interrupted program of the ninth page PG9 after power is recovered.

Hereinafter, the data backup operation DBKU of FIG. 8 is further described with reference to FIGS. 11 and 13. The data backup operation indicates storing risk data in a backup region, that is a backup memory block BMB, of the storage device 3000. The risk data is data that is likely or certain to be damaged by execution of the write task among data stored in a storage region, that is a write memory block WMB, of the storage device. The identification and handling of risk data may be performed automatically in the manners explained herein.

Referring to FIGS. 11 and 13, back up pages BPG1, BPG2, corresponding to data of previous data backup operations, may be stored already in the backup memory block BMB. Whenever a write operation is performed, the previous backup page may be discarded or invalidated and a new backup page may be stored in the backup memory block BMB.

If the sudden power-off occurs during the program of the sixth page PG6 corresponding to the LSB page as illustrated in FIG. 11, the host device 2000 may determine that the program is not completed and request the storage device 3000 to retry the program of the sixth page PG6 after power is restored. In this case, the firmware FW of the storage device 3000 may determine there are no risk data. In other words, the firmware FW may affirmatively not perform the data backup operation when the write task is performed to the LSB page of the multi-level cells.

New data cannot be programmed in the memory cells of the fourth wordline WL4 because they are in the above described soft program states. The fourth page PG4 stored in the third wordline WL3 has a possibility of being affected (i.e., by the program of the fourth page PG4). Thus, the data of the fourth page PG4 may be moved and stored in another portion of the write memory block WMB. In this case, a dummy write operation may be performed to write dummy data in a storage region, that is the third word line WL3 and/or the fourth wordline WL4, of the storage device 3000 when the storage region has an error in stored data or possibility of the error.

If the sudden power-off occurs during the program of the ninth page PG9 corresponding to the MSB page as illustrated in FIG. 13, the host device 2000 may determine that the program is not completed and request the storage device 3000 to retry the program of the ninth page PG9 after power is restored. However, the sixth page PG6 corresponding to the LSB page of the fourth wordline is in the soft programmed states SP1, SP2 and SP3 and thus cannot be corrected. The sixth page PG6 to be damaged by or vulnerable to the execution of the write task may be stored as backup data BPG3 in the backup memory block BMB before the program of the ninth page PG9 is performed. In addition, the eighth page PG8 stored in the adjacent wordline WL5 is determined to be subject to damage by the write task, and the eighth page PG8 may be stored as backup data BPG4 in the backup memory block BMB. As such, the risk data may include at least one page storing data already before the write task is executed. The storage device 3000 may determine whether the risk data PG6 and PG8 are damaged after power is restored. If it is determined that the risk data PG6 and PG8 are damaged, the host device 2000 may restore the risk data PG6 and PG8 based on the backup data BPG3 and BPG4 stored in the backup region, that is, the backup memory block BMB. In addition, as described above, the dummy write operation may be performed to write dummy data in a storage region, that is, the fourth word line WL4 and/or the fifth wordline WL5, of the storage device 3000 when the storage region has an error in stored data or possibility of the error.

As illustrated in FIGS. 11 and 13, the storage region, i.e., the write memory block WMB, in which the write task or the program of the write data is performed, may include multi-level cells such that two or more bits are stored in each multi-level cell. The backup region, that is, the backup memory block BMB in which the data backup operation is performed, may include single-level cells such that one bit is stored in each single-level cell. In other words, the LSB page and the MSB page may be stored in each wordline of the write memory block WMB whereas only one page may be stored in each wordline of the backup memory block BMB. By operating the backup memory block BMB with the single-level cell scheme, the data backup operation may be performed rapidly and the degradation of operation speed and performance of the system may be prevented.

The internal management operation such as the data backup operation and the dummy write operation may be performed during the queuing stage and the ready stage in advance before receiving the write execution command. This timing arrangement may result in reducing the time required for the storage device to respond to the write execution command, and thereby enhance performance of the system.

Figure 15:
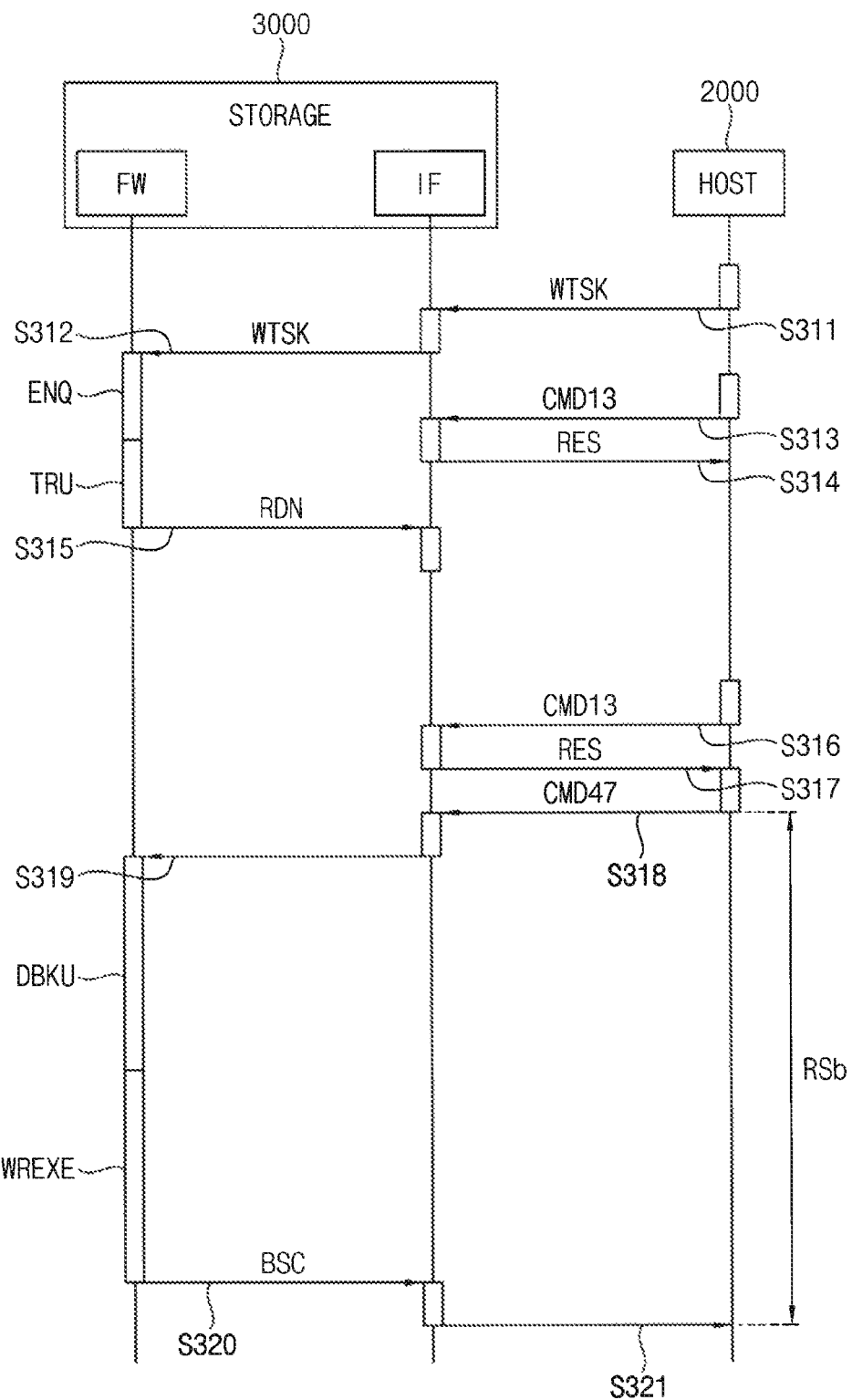
FIG. 15 is a flow chart illustrating a case that an internal management operation is performed after a storage device receives a write execution command.

FIG. 15 is a flow chart illustrating a case that an internal management operation is performed after a storage device receives a write execution command.

The operations or processes S311~S321, ENQ, TRU, DBKU and WREXE in FIG. 15 are substantially the same as the operations or processes S211~S221, ENQ, TRU, DBKU and WREXE in FIG. 8, and thus repeated descriptions are omitted.

In FIG. 8, the firmware FW performs the internal management operation such as the data backup operation DBKU after storing the write task WTSK and before the write execution command CMD47. In contrast, in FIG. 15, the firmware FW begins the internal management operation DBKU after receiving the write execution command CMD47 at S319, and executes the write task WTSK after completing the internal management operation. As a result, the response time RSb of FIG. 15 (from the CMD47 being first sent at S317 to confirmed completion at S321) is longer than the response time RSa of FIG. 8 according to exemplary embodiments.

As such, the internal management operation such as the data backup operation and the dummy write operation may be performed during the queuing stage and the ready stage in advance before receiving the write execution command. This timing arrangement may result in reducing the time required for the storage device to respond to the write execution command, thereby enhancing performance of the system.

Figure 16:
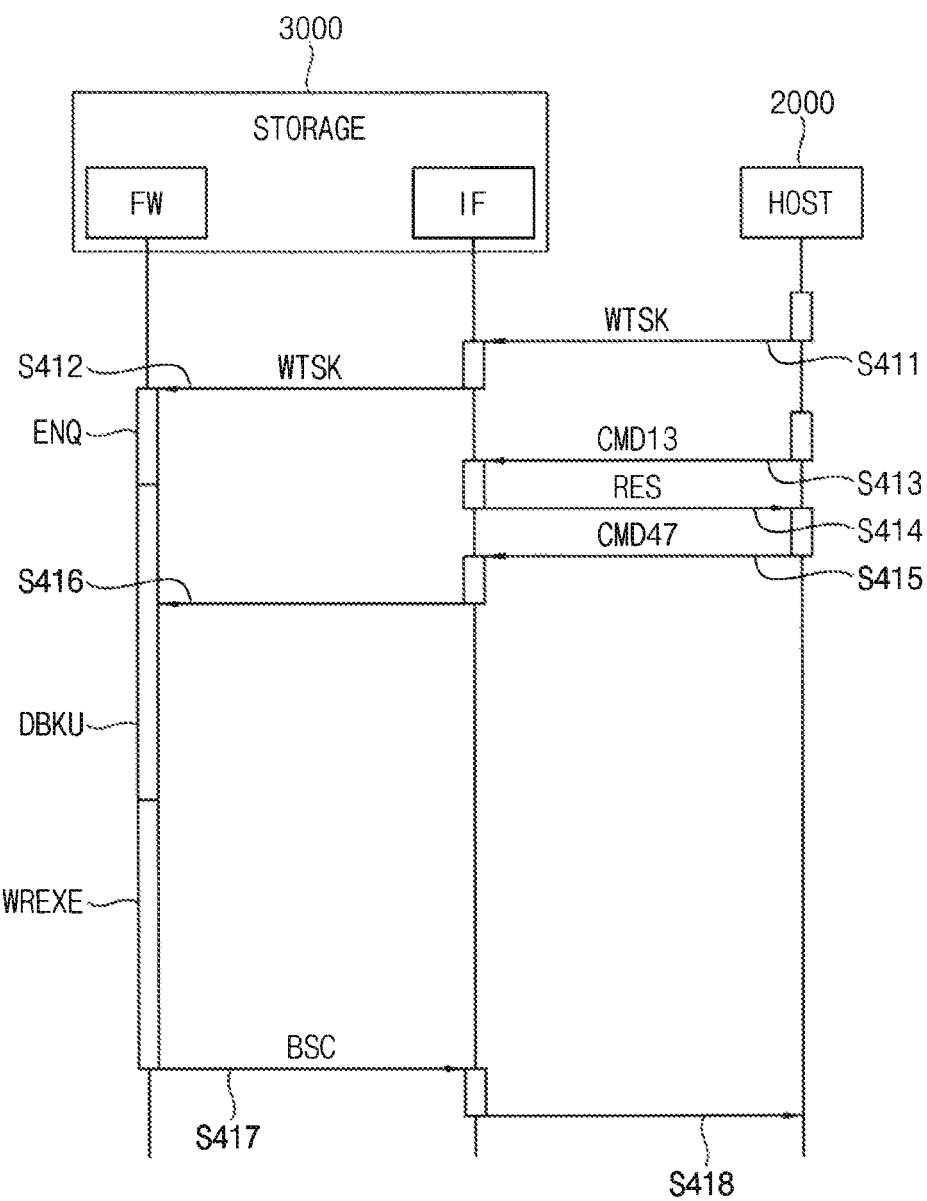
FIG. 16 is a flow chart illustrating a method of operating a storage device according to an example embodiment.

FIG. 16 is another flow chart illustrating a method of operating a storage device according to an example embodiment.

FIG. 16 illustrates an example embodiment that the task queue TQ in the host device 2000 determines whether the write task is ready for execution.

The operations or processes S311~S321, ENQ, TRU, DBKU and WREXE in FIG. 16 are substantially the same as the operations or processes S211~S221, ENQ, TRU, DBKU and WREXE in FIG. 8, and thus repeated descriptions are omitted.

In comparison with FIG. 8 where the firmware FW determines whether the write task WTSK is ready for execution, the task queue TQ determines whether the write task WTSK is ready for execution in FIG. 16. That is, the task queue TQ of the storage device 3000 determines whether the write task WTSK is ready for execution and begins the data backup DBKU before CMD47 is received at S416 and, for example, without performing a task ready upgrade (TRU) as in FIG. 8 or sending a ready status notice (RDN) as in FIG. 8. When the write task WTSK is ready for execution, the task queue TQ may upgrade the status information of the write task WTSK and the firmware FW may perform the internal management operation such as the data backup operation DBKU after storing the write task WTSK in the firmware queue FWQ (ENQ).

Figure 17:
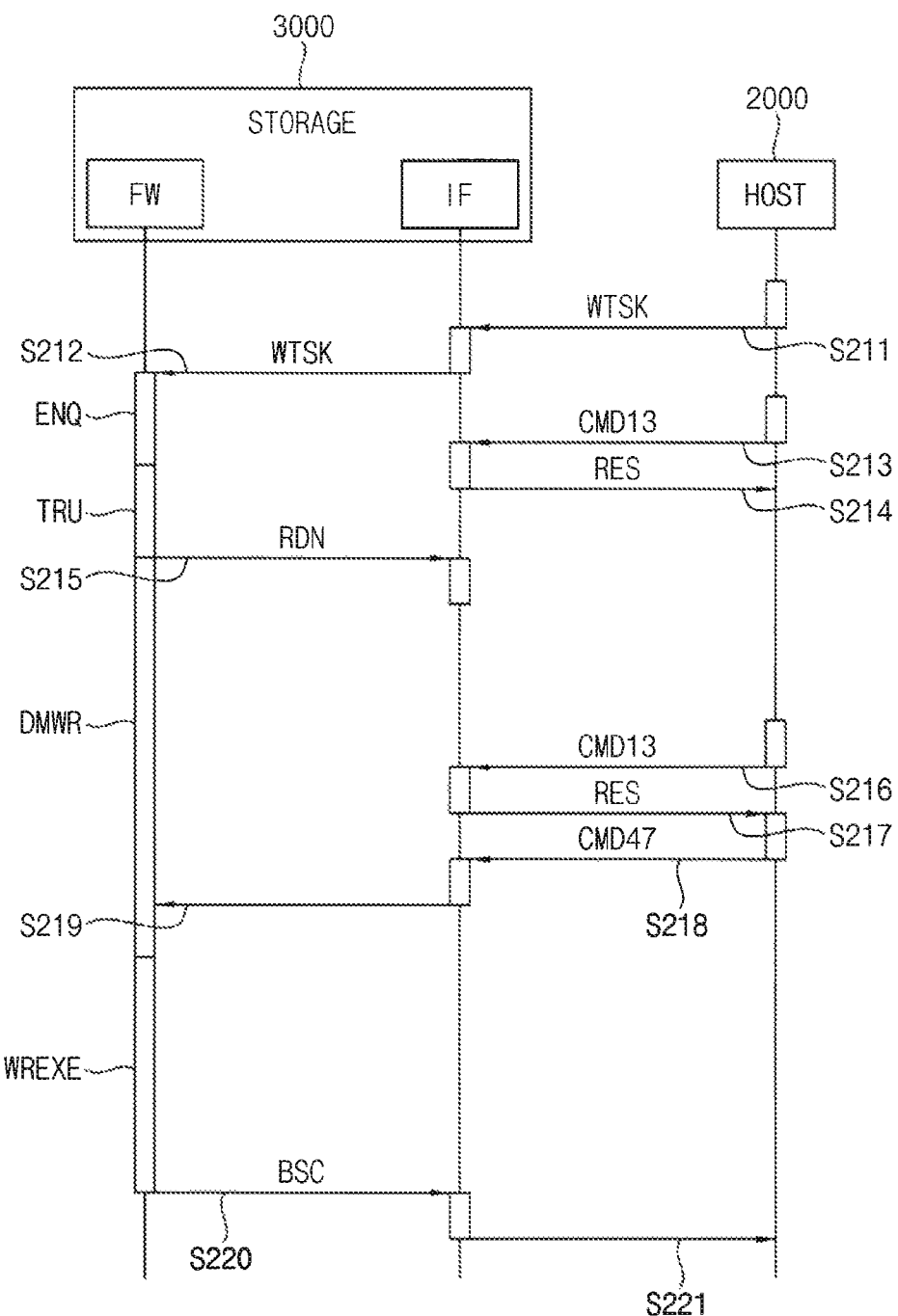
FIGS. 17 and 18 are flow charts illustrating a method of operating a storage device according to exemplary embodiments.
Figure 18:
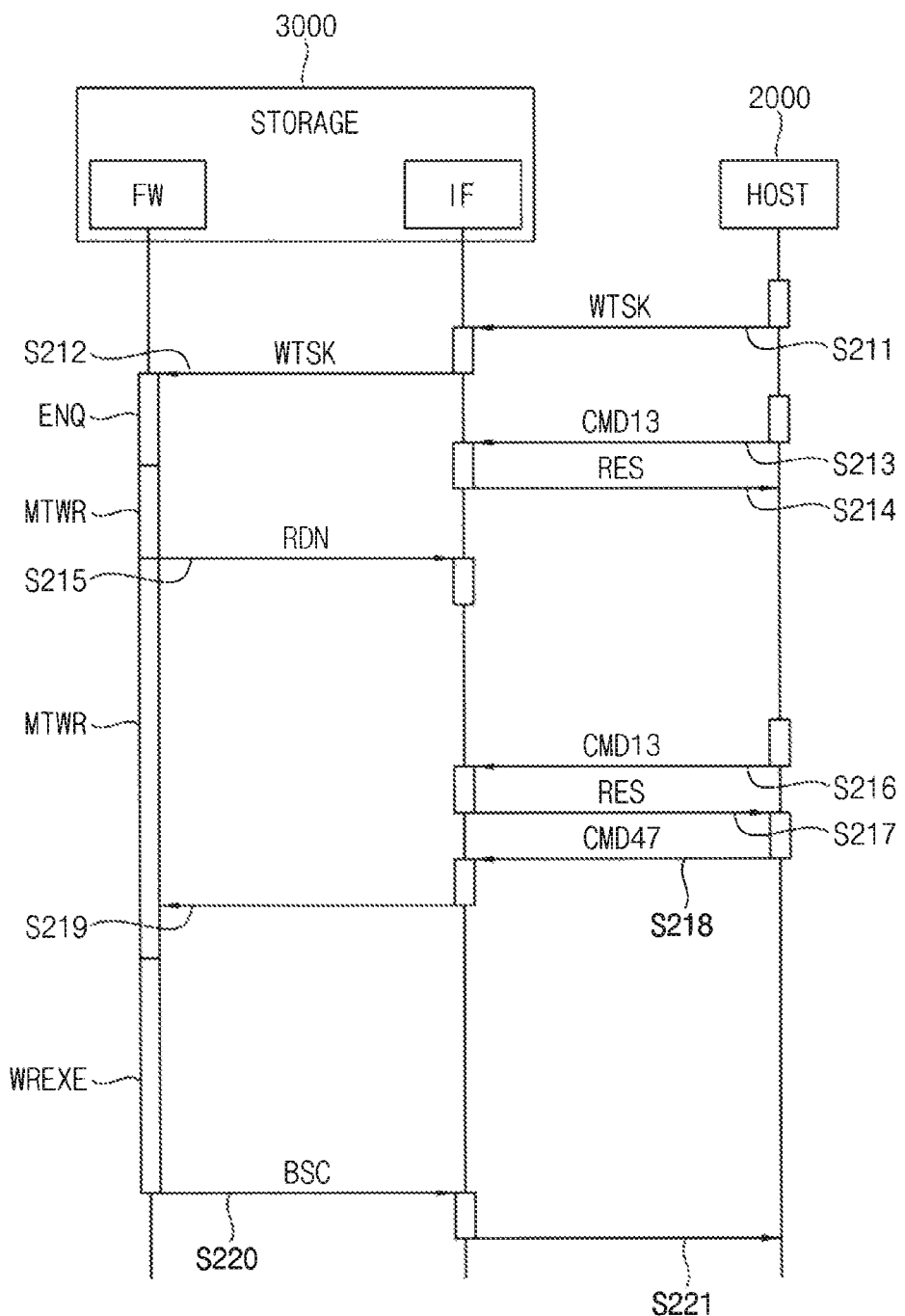

FIGS. 17 and 18 are flow charts illustrating a method of operating a storage device according to exemplary embodiments.

The operations or processes in FIGS. 17 and 18 except the data backup operation DBKU are substantially the same as those in FIG. 8, and thus repeated descriptions are omitted.

In the example embodiment of FIG. 17, the firmware FW may perform the dummy write operation DMWR as the above mentioned internal management operation after storing the write task WTSK in the firmware queue FWQ. As described with reference to FIGS. 11 and 13, the dummy write operation DMWR is writing the dummy data in the storage region of the storage device 3000 when the storage region has an error in stored data or possibility of the error.

In the example embodiment of FIG. 18, the firmware FW may perform the write operation MTWR of meta data as the above mentioned internal management operation after storing the write task WTSK in the firmware queue FWQ. The meta data may include register data and program sequence data that are generated while the firmware FW is executed. In addition, the meta data may include address mapping data, bad block data, etc., which are managed by the flash translation layer (TFL). The meta data may be stored in the buffer memory 240 or the non-volatile memory device 100 in the storage device 3000.

Figure 19:
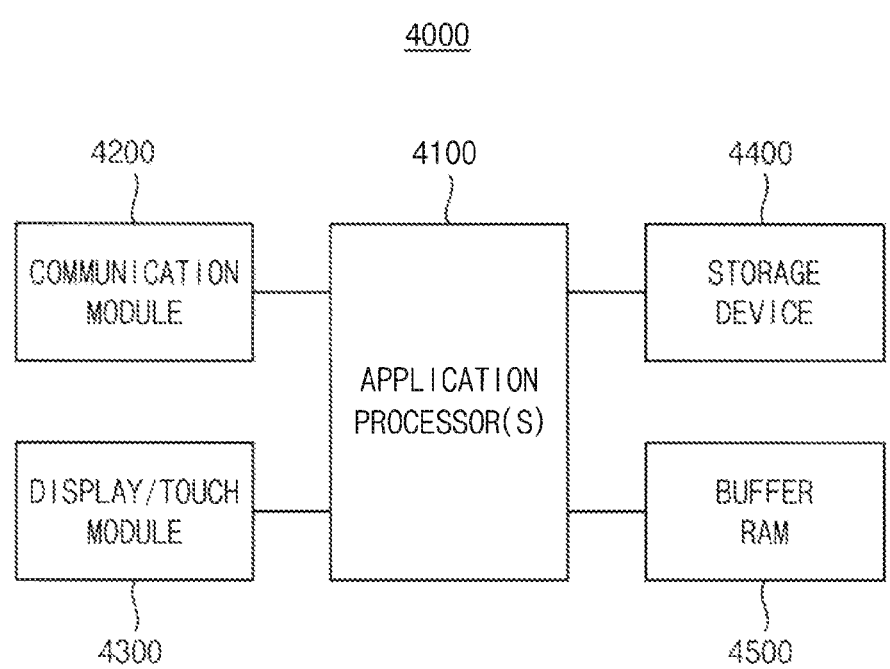
FIG. 19 is a block diagram illustrating a mobile device according to exemplary embodiments.

FIG. 19 is a block diagram illustrating a mobile device according to exemplary embodiments.

Referring to FIG. 19, a mobile device 4000 may include an application processor 4100, a communication module 4200, a display/touch module 4300, a storage device 4400, and a buffer RAM 4500.

The application processor 4100 controls operations of the mobile device 4000. The communication module 4200 is implemented to perform wireless or wire communications with an external device. The display/touch module 4300 is implemented to display data processed by the application processor 4100 and/or to receive data through a touch panel. The storage device 4400 is implemented to store user data.

The storage device 4400 may be eMMC, SSD, UFS device, etc. The storage device 4400 may include the non-volatile memory device disclosed herein. The storage device 4400 may have a configuration for performing the internal management operation before receiving the write execution command as described above.

The buffer RAM 4500 temporarily stores data used for processing operations of the mobile device 4000. For example, the buffer RAM 4500 may be DDR SDRAM, LPDDR SDRAM, GDDR SDRAM, RDRAM, etc.

As described above, the storage device, the system and the associated method according to exemplary embodiments may reduce the response time of the storage device to the write execution command and enhance performance of the system by performing the internal management operation such as the data backup operation during the queuing stage and the ready stage in advance before receiving the write execution command.

The concepts described herein may be applied to any devices and systems including a storage device. For example, the teachings presented herein may be applied to systems such as be a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the concepts described herein.

What is claimed is:

1. A method of operating a storage device, comprising:
   receiving a write task from a host device;
   storing the write task in a task queue included in the storage device and waiting to execute the write task until an internal management operation of the storage device is performed and a write execution command for the write task in the task queue is received;
   receiving the write execution command from the host device for the write task in the task queue;
   executing the write task in response to the write execution command received for the write task in the task queue; and
   performing the internal management operation of the storage device after the write task is stored in the task queue and before the write execution command is received.

2. The method of claim 1, wherein performing the internal management operation includes:
   performing a data backup operation to store risk data in a backup region of the storage device, the risk data indicating data to be damaged by execution of the write task among data stored in a storage region of the storage device.

3. The method of claim 2,
   wherein the storage region includes a plurality of multi-level cells where each multi-level cell stores a plurality of bits, and the risk data include at least one page of data stored already before the write task is executed.

4. The method of claim 3,
   wherein the data backup operation is not performed when the write task is executed with respect to a least significant bit page.

5. The method of claim 2,
wherein the backup region includes a plurality of single-level cells where each single-level cell stores one bit.

6. The method of claim 2, further comprising:
when the risk data are damaged, restoring the risk data based on backup data stored in the backup region.

7. The method of claim 1, further comprising:
when the storage device is ready to execute the write task stored in the task queue, sending a ready notice informing the host device that the write task is ready for execution.

8. The method of claim 7, wherein the host device sends a status check command repeatedly to the storage device until the host device receives the ready notice.

9. The method of claim 1, wherein receiving the write task from the host device includes:
receiving a write set command including task identification (ID), transfer direction information indicating a direction of data transfer, data size information indicating a size of write data and priority information; and
receiving a write address command indicating an address of the write data.

10. The method of claim 1, wherein performing the internal management operation includes:
performing a dummy write operation to write dummy data in a storage region of the storage device when the storage region has an error in stored data or when possibility of the error is determined.

11. The method of claim 1, wherein performing the internal management operation includes:
writing meta data for control of the storage device.

12. The method of claim 1,
wherein the storage device is an embedded multimedia card (eMMC) including a non-volatile memory device.

13. A storage device, comprising:
a non-volatile memory device; and
a storage controller configured to control the non-volatile memory device, the storage controller comprising:
a task queue storage configured to store a write task provided from a host device and status information of the write task until an internal management operation of the storage device is performed and a write execution command for the write task in the task queue is received; and
a processor configured to control the storage controller, the processor performing the internal management operation of the storage device after the write task is stored in the task queue storage and before the write execution command is received from the host device for the write task in the task queue, wherein the write task is executed by the storage device in response to the write execution command received for the write task in the task queue.

14. The storage device of claim 13,
wherein the task queue storage transfers the write task to the processor and firmware executed by the processor stores the write task in a firmware queue.

15. The storage device of claim 14,
wherein the firmware determines whether the write task is ready for execution and, when it is determined that the write task is ready for execution, the firmware notifies the task queue storage of ready status of the write task and then performs the internal management operation and the task queue storage updates the status information in the task queue storage.

16. The storage device of claim 14,
wherein the task queue storage determines whether the write task is ready for execution and, when it is determined that the write task is ready for execution, the task queue storage updates the status information and the firmware performs the internal management operation after the write task is stored in the firmware queue.

17. The storage device of claim 14,
wherein the internal management operation includes a data backup operation to store risk data in a backup region of the storage device, the risk data indicating data to be damaged by execution of the write task among data stored in a storage region of the storage device.

18. The storage device of claim 14,
wherein the internal management operation includes a dummy write operation to write dummy data in a storage region of the storage device when the storage region has an error in stored data or possibility of the error.

19. The storage device of claim 14,
wherein the internal management operation includes a write operation of meta data for control of the storage device.

20. A system, comprising:
a host device; and
an embedded multimedia card (eMMC) controlled by the host device, the embedded multimedia card performing an internal management operation of the embedded multimedia card after a write task provided from the host device is stored in a task queue included in the embedded multimedia card and before a write execution command is received from the host device for the write task in the task queue to execute the write task in the task queue, wherein the write task is stored in the task queue while waiting to execute the write task until the internal management operation of the embedded multimedia card is performed and the write execution command for the write task in the task queue is received.

* * * * *